United States Patent [19]

Beers

[11] 4,360,220
[45] Nov. 23, 1982

[54] INDEPENDENT, LOAD-SEEKING, PRELOADED, VEHICLE SUSPENSION

[76] Inventor: Lionel W. Beers, 16730 NE. Hassalo St., Portland, Oreg. 97230

[21] Appl. No.: 167,829

[22] Filed: Jul. 14, 1980

[51] Int. Cl.³ ............................................. B60G 5/02
[52] U.S. Cl. .................................... 280/677; 280/685
[58] Field of Search .............. 280/677, 678, 681, 685, 280/112 R

[56] References Cited

U.S. PATENT DOCUMENTS

| | | | |
|---|---|---|---|
| 2,193,567 | 3/1940 | Pointer | 280/685 |
| 2,493,004 | 1/1950 | Mackie | 280/677 |
| 2,754,131 | 7/1956 | Tulin | 280/677 |
| 2,876,466 | 3/1959 | Baldwin | 280/677 |
| 3,363,913 | 1/1968 | McFarland | 280/685 |
| 3,387,857 | 6/1968 | Roberts | 280/685 |
| 4,128,260 | 12/1978 | Moore | 280/685 |
| 4,155,570 | 5/1979 | Wiley, Jr. | 280/677 |

*Primary Examiner*—Robert R. Song
*Attorney, Agent, or Firm*—Lee R. Schermerhorn

[57] ABSTRACT

A tandem wheel suspension unit contained in a wheel well on a trailer. A frame is supported by a precompressed coil spring on the trunion shaft of a walking beam assembly, the walking beams having stops engaging said frame to normally prevent oscillation of the beams. The precompression of the supporting spring prevents one wheel from dropping into a highway chuckhole while permitting each wheel to rise in response to the impact shock upon striking an obstruction on the road.

10 Claims, 8 Drawing Figures

U.S. Patent  Nov. 23, 1982  Sheet 1 of 3  4,360,220
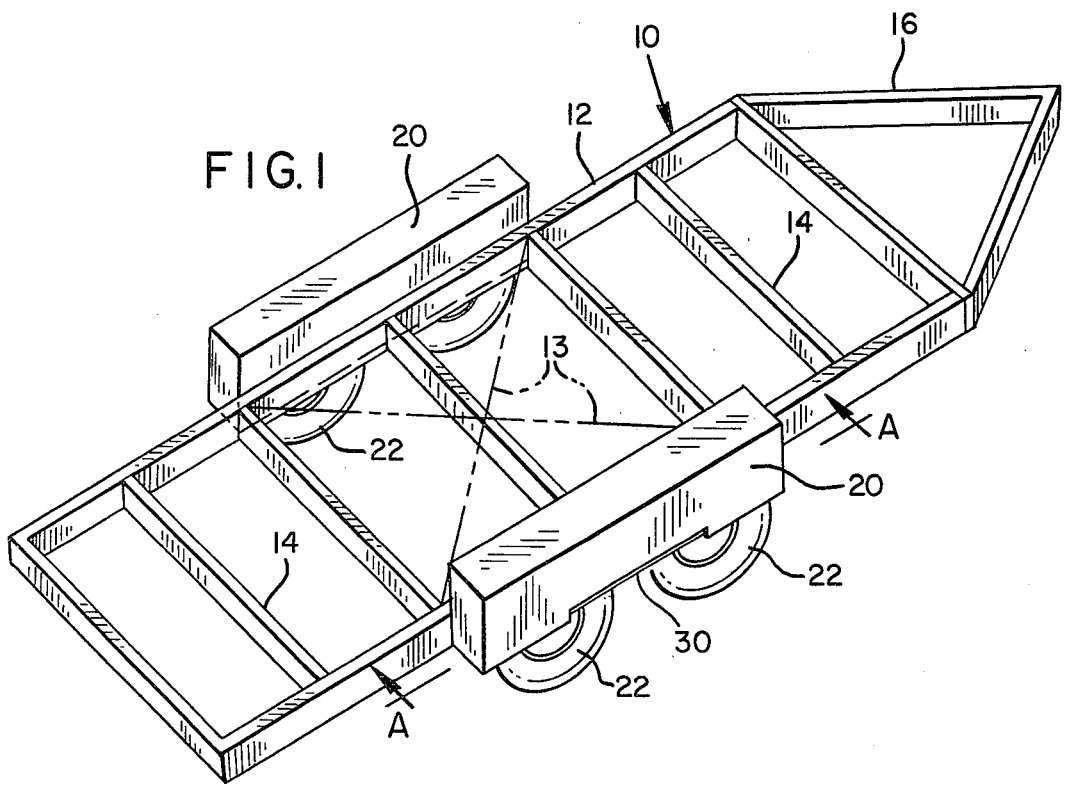
FIG.1
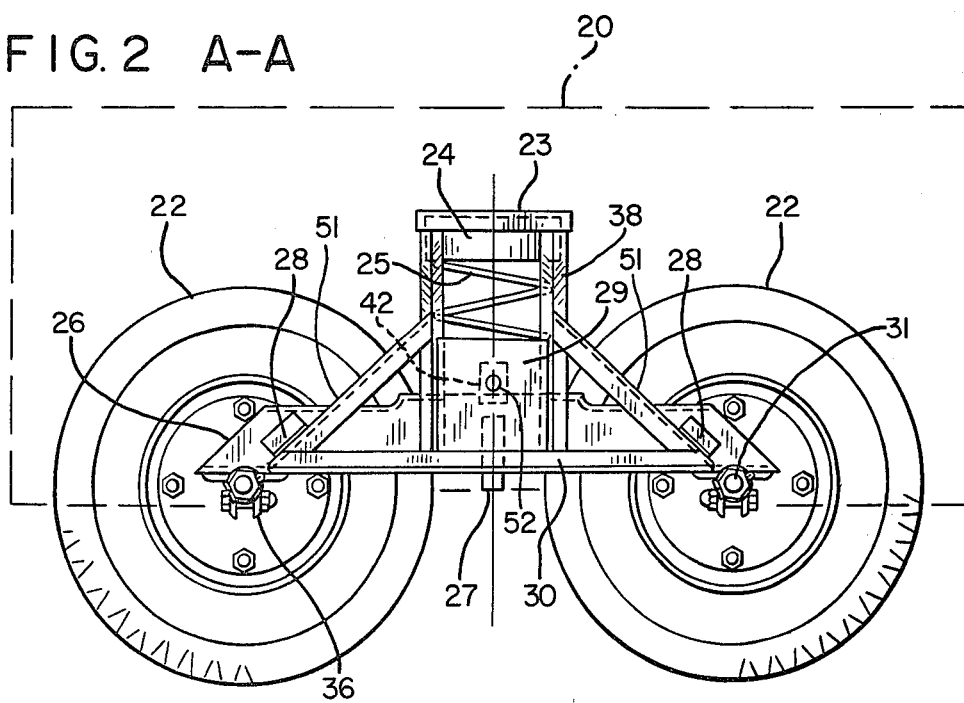
FIG.2 A-A

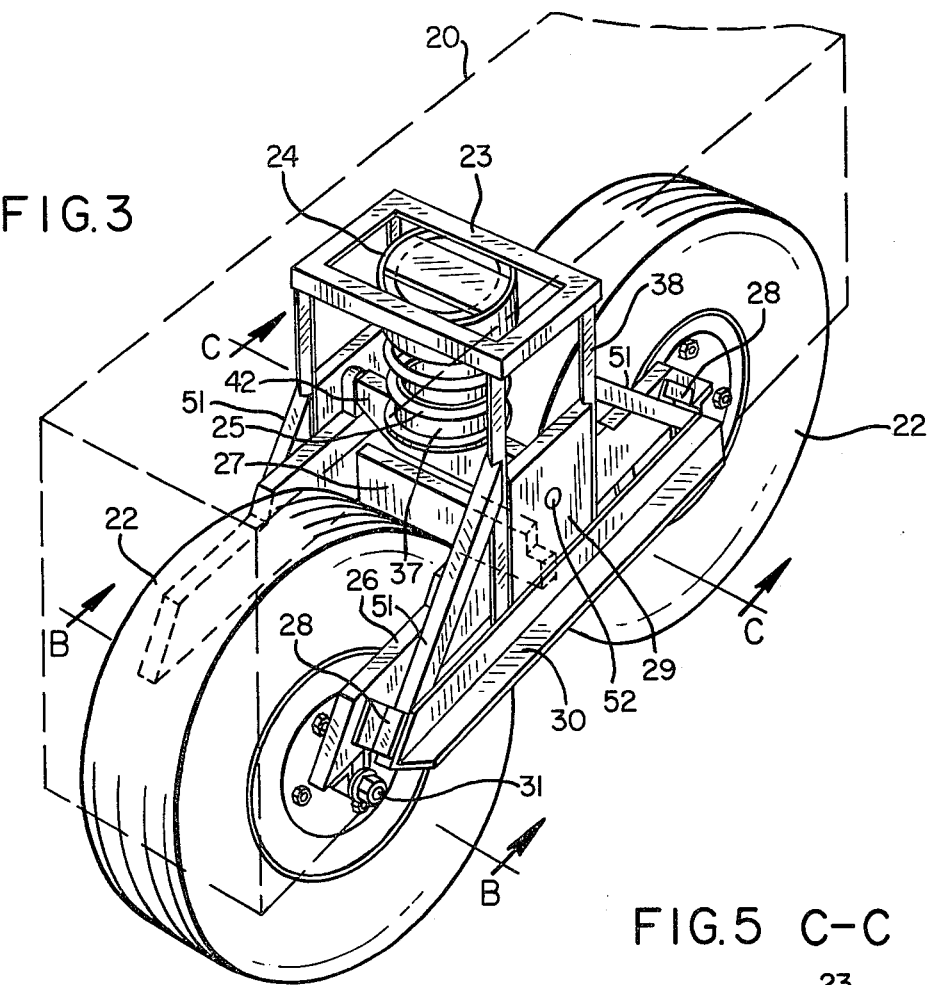
FIG. 3
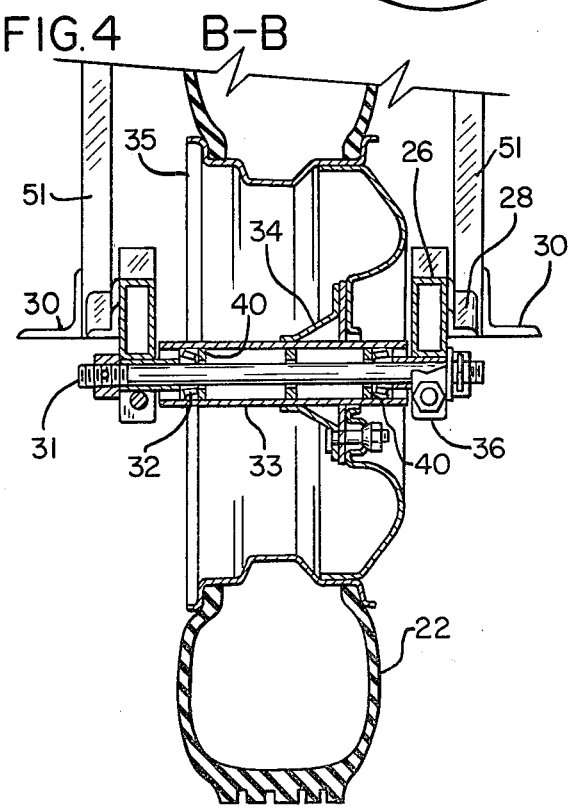
FIG. 4 B-B
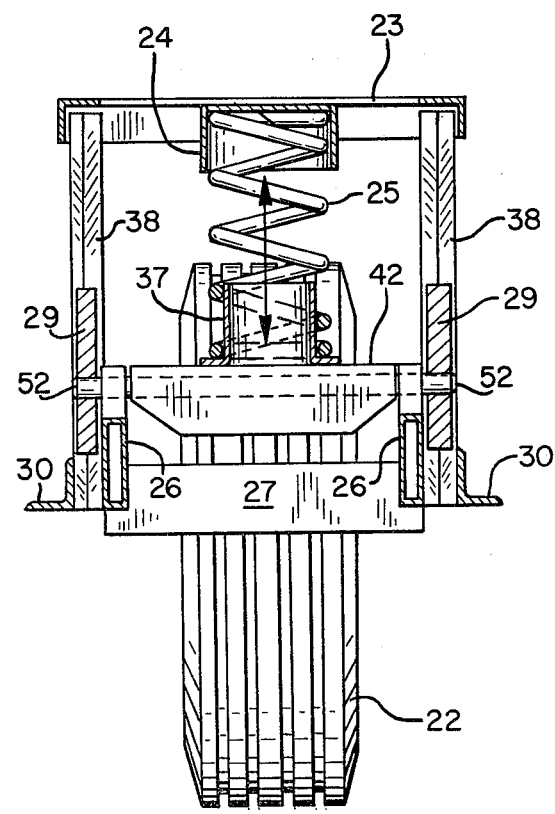
FIG. 5 C-C

INDEPENDENT, LOAD-SEEKING, PRELOADED, VEHICLE SUSPENSION

This invention relates to improvements in trailer suspension systems heretofore unattained, and more particularly to a novel assembly embodying special provisions which advance the state of the art beyond axle-joined, pivot-shafted, scissor-sprung complicated arrays of loosely fitted parts and rocker arms. This unique suspension system for trailers totally advances the art by virtue of its self-containment within the wheel well.

In personal experiences with prevailing suspension methods, there have long been recognized but unsatisfactory solutions, many of which remain on paper, burdened with first or second generation solutions, which necessitates that urgent considerations be applied to produce the suspension system herein disclosed, which has functionally interwoven the concepts of independent function principles with overriding performance constraints.

This fresh new concept will be shown to advance the state of the art in the objectives and claims as follows.

It is therefore one objective of this invention to provide a tandem wheel suspension which can be used on *any* framework.

Accordingly, a principal objective of this invention is to provide a stable self-contained suspension system free from outrigger strut and pivot shaft connections, which require added maintenance and are subject to flexure, thus reducing vehicular sideways stability and cornering stability.

Another objective of this contemporary age invention is to solve the primary suspension problem and thereby set the standards by virtue of its load-seeking beam, referred to on earlier generations as a walking beam, however herein re-described in view of its new performance constraints. Here the load seeker shifts the trailer load to the wheel which is not seeing the road impairment. As the front wheel enters the road impairment, such as a hole, it is held in suspension by 28 and will not travel into the hole by virtue of the load seeker inter-tie with the wheel still on stable ground. As the front wheel passes beyond the hazard area, this tire-saving as well as shock-absorbing action shifts the load to the front wheel, which is now on stable road.

Still another objective is to reduce cost, maintenance, and weight. This is accomplished by fewer parts and connections and by lighter weight construction based on system engineering concepts applied to structural design.

Another objective of this invention is to provide a suspension system characterized by superior stability in cornering and side-sway. This is accomplished through preloaded springs and structural sub-system shock and load attenuating constraints brought about through an interrelationship between system and sub-systems, or more particularly via the structural configuration.

The foregoing objectives will clearly appear from the following detailed description of the embodiment of the invention when the description is considered in connection with the accompanying drawings where:

FIG. 1 is a perspective view of a vehicle frame having the embodiment of this invention connected thereto.

FIG. 2 is a side view taken along line A—A of FIG. 1.

FIG. 3 is a perspective view showing the general assembly and component identification.

FIG. 4 reflects sectional views taken along lines B—B of FIG. 3.

FIG. 5 is a detailed sectional view taken along line C—C of FIG. 3.

Figure 6:
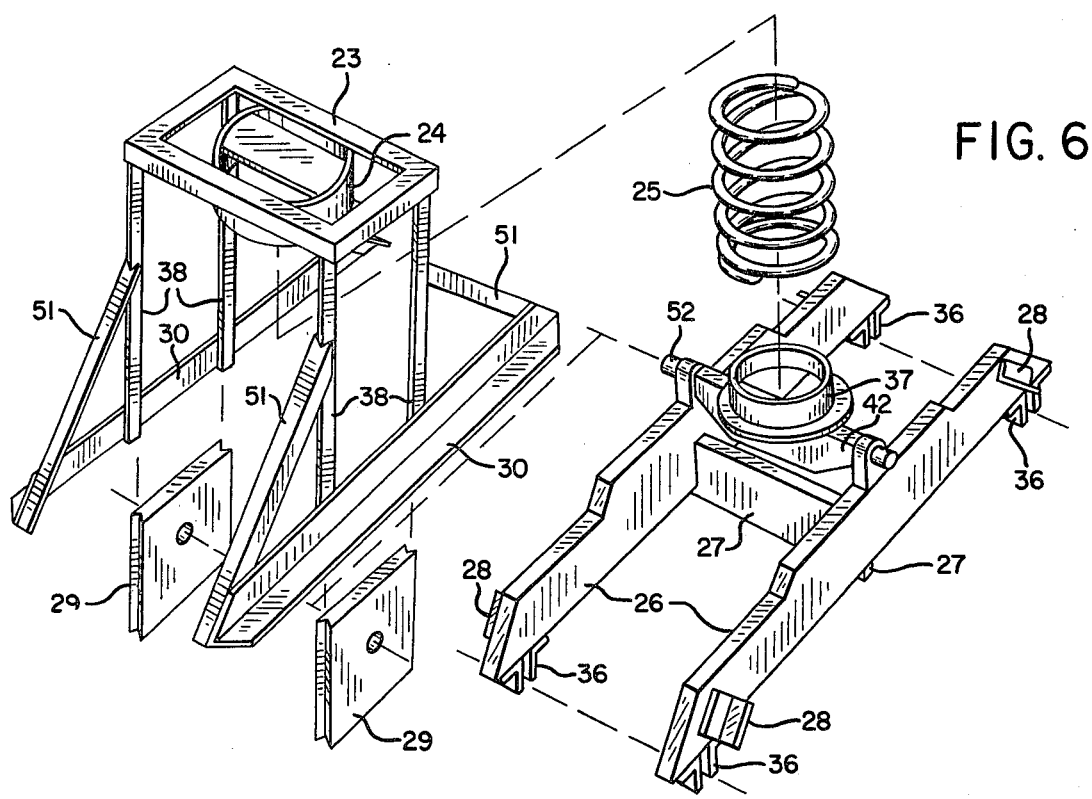

FIG. 6 is an exploded view of the general assembly with the wheels and axles omitted.

Figure 7:
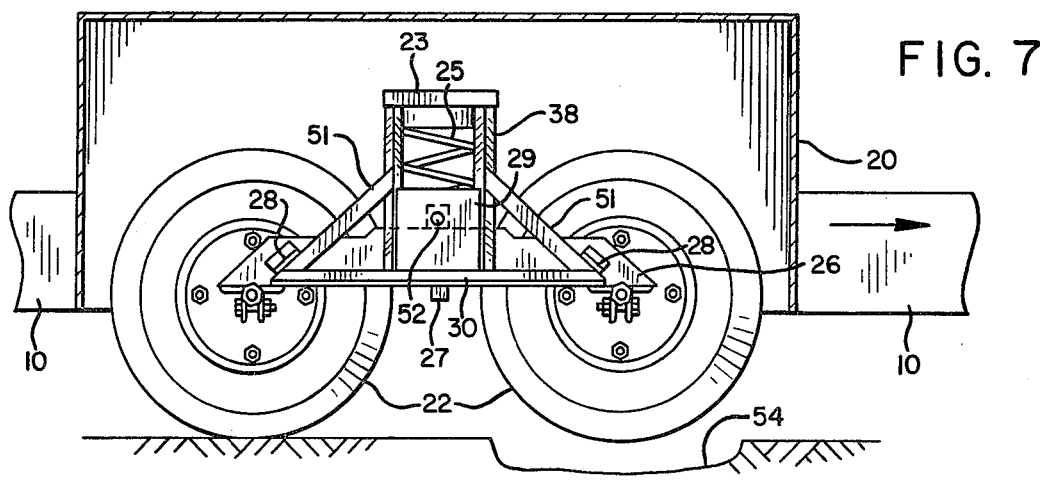

FIG. 7 is a view similar to FIG. 2 showing the reaction of the suspension to a depression in the road.

Figure 8:
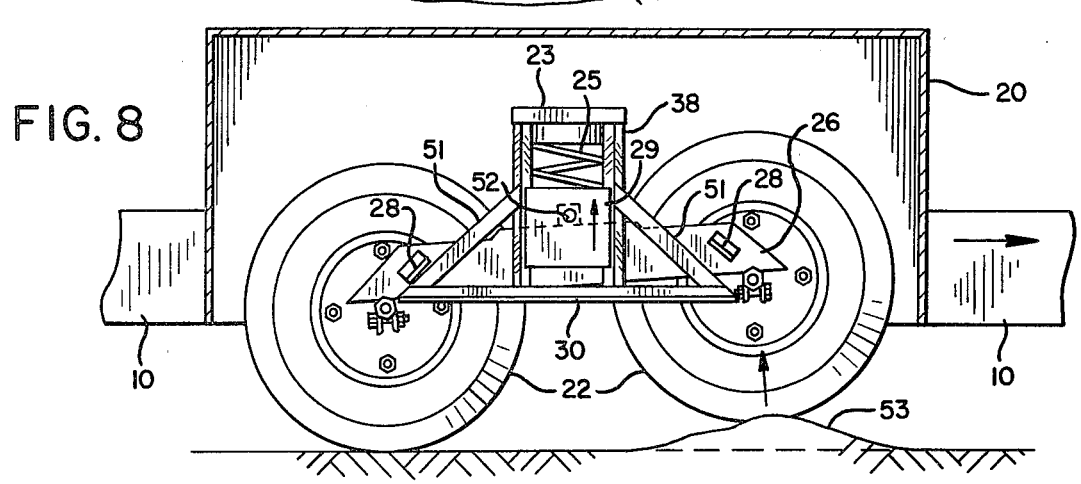

FIG. 8 is similar view showing the reaction of the suspension to an obstruction on the road.

The embodiments of the principles of these state of art advancements herein contained are not intended to limit the mode of attainment, but merely to satisfy an application wherein practical use is illustrated.

Referring now by characters of reference to the drawings, in FIG. 1 the frame 10 and members 12, 14, 16 and 13 are to be viewed as representative of typical trailer frame construction and will vary in size and arrangement depending on the service for which the trailer is intended.

The trailer suspension is composed of two independent self-contained wheel well assemblies, wherein well 20 (FIG. 2) encases and is a part of rigged frame 23 and longitudinal tie bracing assembly 30. Within this modularly designed, solid framework is housed the load seeker pair of rails 26 to which at each end tire 22 is mounted. The tire wheel hub 35 (FIG. 4) is bolted to hub ring 34, which is welded to axle assembly 33, forming a unitized hub, seal and bearing housing. Through this assembly shaft 31 extends to anchor point 36 on the load seeker rails 26. A bearing plate 40 is press fit to a shoulder within assembly 33 with bearing sets 32 critically positioned to resist radial, thrust and shock loading. This simple axle assembly is typically mounted and positioned for each wheel on the load seeker rails 26 which in turn transmit the actions generated at the road to the central load response center 42 (FIG. 5). Here preloaded spring coil 25, located over and aligned vertically with the self-centering wheel assemblies, receives and absorbs first run loading. This integral major system interface member 25 working in coordination with second line rotational sub-system burden translator 42 provides the central point whereby an angular baseline profile may be assumed responsive to any road impairment. Stop blocks 28 (FIG. 3) act as suspension points preventing the wheel in suspension from dropping in holes but so arranged as to allow the wheel, individually, to rise in passing over obstructions. Further to the action of the load center control members 25 and 42 (FIG. 3) is the incorporation of the vertical energy dissipating and unidirectional force guides 38 (FIG. 3) which, in conjunction with slide block 29, allow the final element of translation to occur within the designed constraints of the invention. Here member 29 is shown as a slide block channeled within slide rails 38; this embodiment is not intended to limit the invention's precise forms, but merely to describe and explain the principles of the invention. Coil spring 25 is held in containment within upper spring cap 24 and encapsulates the lower anchorage base spring insert 37. The foregoing illustrative verbiage has outlined a suspension system which is completely self-contained.

As best seen in FIG. 6, frame 23 is an inverted U-shaped frame having a pair of depending vertical legs overlying and straddling the pair of walking beam rails 26. Each leg of this frame comprises a pair of the previously mentioned vertical slide rails 38 for one of the vertically slidable slide blocks 29. A longitudinal tie bracing assembly, or rail, 30 is rigidly connected to the lower ends of each pair of vertical legs 38. Diagonal braces 51 are welded to their upper ends to legs 38 and at their lower end to rails 30. The two rails 30 on each suspension unit connect the unit to the lower longitudinal edges of well 20 to support the trailer.

Spring insert 37 supports the lower end of spring 25 on load response center, or support, 42 on trunion shaft 52, the ends of which shaft extend through walking beams 26 and are received in slide blocks 29. Walking beams 26 are interconnected by a cross member 27. In travel on a smooth road surface, the preloaded spring 25 holds the ends of rails 30 up against stop blocks 28 as shown in FIGS. 2 and 3.

When an obstruction 53 is encountered, as shown in FIG. 8, the forward ends of walking beams 26 yield to the shock of the impact and lift the forward stop blocks 28 off the front ends of rails 30 causing the walking beams to rotate on trunion shaft 52. When the leading wheel passes beyond the obstruction, the forward stop blocks 28 drop back on rails 30 and when the trailing wheel strikes the obstruction the rear stop blocks are lifted off the rear ends of rails 30.

The suspension responds differently to an abrupt depression in a road surface, as shown in FIG. 7, this being the most common type of surface irregularity resulting from lack of proper upkeep of paved roads. In this case the precompression of spring 25 holds both ends of rails 30 up against stop blocks 28 so that the landing wheel does not drop into the depression 54. Such chuckholes are usually of less width than the distance between axles 31 whereby the leading wheel passes smoothly to the normal road surface on the opposite of the chuckhole without imparting shock to the trailer. The rear wheel then passes over the depression in a similar manner without dropping down, until it reaches the normal road surface on the opposite side of the depression.

What I claim is:

1. A self-contained tandem two wheel suspension unit for a vehicle comprising a pair of walking beams on opposite sides of said wheels, a pair of axles for said wheels on the opposite ends of said walking beams, a trunion shaft interconnecting central portions of said walking beams between said wheels, a frame for mounting said unit on a vehicle, a spring support for said frame on said trunion shaft, and stop means on opposite end portions of said walking beams engaging said frame to hold said spring support in preloaded condition.

2. A unit as defined in claim 1, said stop means engaging a pair of longitudinal rails on opposite sides of said frame extending alongside said walking beams.

3. A unit as defined in claim 2, said rails serving as mounting means for mounting said unit on a vehicle.

4. A unit as defined in claim 3, said frame being of inverted U-shape having a pair of vertical legs straddling said central portions of said walking beams.

5. A unit as defined in claim 4, said rails being mounted on the lower ends of said legs of said frame.

6. A unit as defined in claim 4 including a pair of slide blocks receiving the opposite ends of said trunion shaft and slidable vertically in said legs of said frame.

7. A unit as defined in claim 6 including a pair of spring seats for said spring support on said trunion shaft and in the top of said frame.

8. A unit as defined in claim 7, said spring support comprising a coil spring.

9. A unit as defined in claim 6, the preloading of said spring support being sufficient to cause said stop means to hold the leading wheel in suspension in entering a road depression and hold the trailing wheel in suspension when the leading wheel has left the depression, said preloading permitting the rocking of said walking beams in response to the shocks on the wheels in passing over obstructions.

10. A unit as defined in claim 6 wherein all of the operating mechanism of the unit is contained in a wheel well housing which is adapted for mounting on the vehicle.

* * * * *